United States Patent [19]

Schaefer

[11] Patent Number: 5,148,237
[45] Date of Patent: Sep. 15, 1992

[54] RING LASER GYRO WITH AN ABSORBER MEDIUM WITH THE LASER CAVITY

[75] Inventor: Fritz P. Schaefer, Goettingen, Fed. Rep. of Germany

[73] Assignee: Max-Planck-Cesellschaft zur Foerderung der Wissenschaften e. V., Fed. Rep. of Germany

[21] Appl. No.: 545,391

[22] Filed: Jun. 28, 1990

[30] Foreign Application Priority Data

Jun. 29, 1989 [DE] Fed. Rep. of Germany ....... 3921424

[51] Int. Cl.$^5$ .............................................. G01C 19/66
[52] U.S. Cl. ...................................... 356/350; 372/94
[58] Field of Search ...................... 356/350; 372/94, 21

[56] References Cited

U.S. PATENT DOCUMENTS 4,429,393 1/1984 Giuliano ............................. 356/350

OTHER PUBLICATIONS

Alternative Interpretation of Rotation Rate Sensing by Ring Laser E. O. Schulz-DuBois, Aug. 1966 Jour. of Quantum Electronics vol. QE2

"The Ring Laser Gyro" by W. W. Chow, J. Gea-Banacloche and Pedrotti Review of Modern Physics, vol. 57, No. 1, Institute for Modern Optics, Univ. of New Mex. Jan. 1985.

Primary Examiner—Samuel A. Turner
Assistant Examiner—LaCharles P. Keesee
Attorney, Agent, or Firm—Anthony H. Handal

[57] ABSTRACT

A ring laser gyro has an optical resonator (12), forming a loop- or ring-shaped beam cavity, a lasing medium (14) arranged in the resonator for furnishing, when stimulated, two laser oscillation pulses circulating in the resonator in opposing directions, and a device for measuring the change in frequency and/or wavelength of the laser oscillation pulses as a function of the rotation of the resonator. A saturable absorber (16) is arranged in the laser resonator for the purpose of fixing the standing wave resulting due to the laser oscillation pulses circulating in the opposing directions as regards the laser resonator. Rotation of the laser resonator changes the wavelengths of the laser oscillation pulses circulating in opposing directions. The change in wavelength and/or the difference in the frequencies of the laser oscillation pulses constitute a measure of the rotation rate. No effect making it difficult to measure low rotary speeds in known ring laser gyros occurs in the present ring laser gyro.

8 Claims, 2 Drawing Sheets

RING LASER GYRO WITH AN ABSORBER MEDIUM WITH THE LASER CAVITY

FIELD OF THE INVENTION

The present invention relates to a ring laser gyro.

DESCRIPTION OF THE RELATED ART

A ring laser gyroscope contains a ring cavity around which two laser light beams travel in opposite directions. In a passive ring laser gyro the laser beams of a laser located outside of the ring cavity are coupled into the cavity by means of a beam splitter. In an active ring laser gyro an active laser medium is located in the ring cavity which operates as a laser resonator.

In the laser gyro use is made of the Sagnac effect to produce a signal which is proportional to the rotation rate of the laser gyro about an axis perpendicular to the plane of the ring cavity and passing through the center of this plane. An excellent and detailed overview of the state of the art of laser gyro technology can be found in the publication by Chow et al., "The ring laser gyro", Review of Modern Physics, Vol 57, 1985, pages 61-104.

The main advantage afforded by the laser gyro, which has been known now for some 15 years, as compared to conventional electromechanical gyroscopes is the substantially higher reliability due to the absence of moving mechanical parts. The sensitivity currently achievable in commercially available instruments of this kind is of the order of 0.01 deg/h which is just sufficient for passenger aircraft operation. There are, however many applications, e.g. in space flight, where a sensitivity of at least two orders higher is required.

Increasing the sensitivity of known laser gyroscopes is made difficult by the so-called "lock-in effect" which in the case of very small rotation rates produces a dead zone in which no signal is output. To overcome this lock-in effect it is usual in conventional laser gyros to introduce a mechanical "mirror dither" movement which, however, ruins one of the main advantages of laser gyros, namely the absence of mechanically moving components.

On the basis of prior art as aforementioned the object of the present invention is to increase the sensitivity of a laser gyro of this kind. This object is achieved by the invention as featured in the claims and explained in more detail in the following.

The present invention is based on a new effect by means of which a sensitivity can be achieved many orders higher. Carefully comparing the Sagnac effect to the new effect shows that no lock-in effect as evident in known ring laser gyros occurs in the ring laser gyro according to the invention. As discussed by Schulz-Dubois (IEEE J. Quant. Electron. QE-2 (1966) (299) the Sagnac effect can be visualized as follows by imagining an ideal cylindrical resonator having circular bottom and top planes, the walls of which are ideally conducting and thus reflect completely without loss. In this resonator a natural mode is excited corresponding to two waves of the same frequency moving in opposite directions along the circumference which superimpose into a standing wave along the circumference. When the resonator is then turned about the axis of the cylinder the standing wave remains steady due to its inertial mass (in accordance with mass-energy equivalence) and glides along the inside wall of the cylinder without any friction whatsoever. Through a small port the wave can be coupled out to permit counting the number of oscillation antinodes passing by per unit of time and thus measure the rotation rate. Should there be a scattering particle anywhere on the inside wall of the cylinder it backscatters a very small portion of the wave running counter to the scattering particle corresponding to the amount of scatter, superimposing it inphase on the travelling wave. This means that the standing wave is no longer stationary but has set itself in motion at a low initial velocity in the direction of movement of the inside wall itself. Due to the continuing effect of the scatter particle the rotation rate of the standing wave continues to increase until it has become precisely the same as that of the cylinder. Since the rotation rate of the wave and the cylinder is then the same, the above-mentioned count signal (number of oscillation antinodes per second) drops to zero. This is the disturbing lock-in effect resulting in a dead zone occuring at low rotation rates in which no signal is output and which can never be completely eliminated even by using an extremely low scatter mirror.

SUMMARY OF THE INVENTION

Whilst conventional laser gyros making use of the Sagnac effect are intended, where possible, to prevent the standing wave (e.g. due to the effect of a scattering particle) from "sticking" to the wall of the resonator, to eliminate the lock-in effect, the laser gyro according to the present invention which works according to the new effect promotes this "sticking" of the standing wave on the resonator by a saturable absorber or an element having the same effect in this respect being introduced. This, of course, does changes away with the Sagnac signal. But now, however, a signal is modified by dispersion existing in the resonator (namely at least due to the active laser medium and the saturable absorber and/or other optical elements such as prisms etc) so that the two opposed pulses are able to tune their center frequency to such an extent that due to the opposing effect of the dispersion at the various wavelengths the round-trip time required by both pulses is just equal and the two again superimposing in the saturable absorber or the like to form a standing wave which is "locked in" the resonator. It will be appreciated that it takes a certain time to tune to these shifted wavelengths. If the resonator is rotary accelerated too quickly the pulses, which are required to be as short as possible, but in any case substantially shorter than the circumference of the resonator, are unable to meet in the saturable absorber. The loss rate would then be too high, the laser emission ceases and the signal drops to zero. Thus whilst in the unaltered Sagnac effect a dead zone occurs at low angular velocities (rotation rates) the laser gyro of the present invention and making use of the new effect, is limited by a defined maximum rotation acceleration.

BRIEF DESCRIPTION OF THE DRAWINGS

With reference to the drawings the invention will now be explained in more detail, in which.

DESCRIPTION OF THE PREFERRED EMBODIMENT

Figure 1:
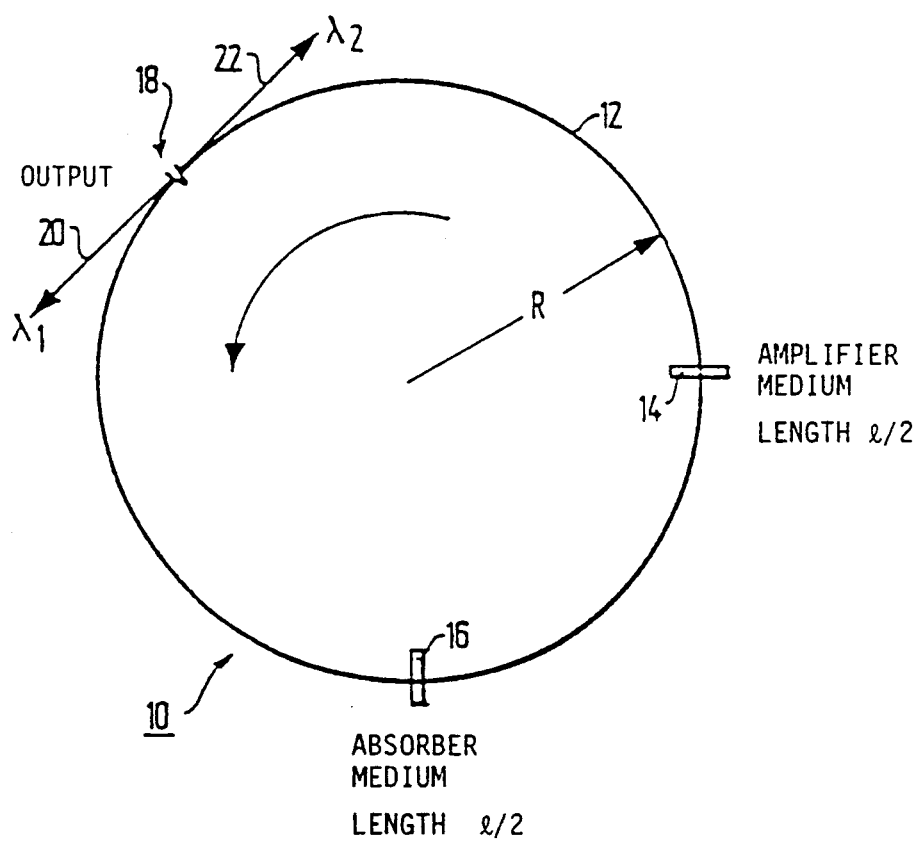
FIG. 1 shows a greatly simplified single-line drawing representing the laser gyro according to the invention.

FIG. 1 shows a greatly simplified single-line drawing representing an ideal laser gyro according to the invention. The laser gyro 10 comprises a laser ring resonator 12 represented by the circle having the radius R containing an active amplifier or gain medium ("laser medium") 14 of thickness l/2 and having a saturable absorber medium 16 spaced at a ¼ of the circumference of the ring resonator, said absorber medium 16 also having the thickness l/2. To facilitate the explanation it is first assumed that the lasing medium 14 is a jet of a solution of rhodamine 6G in ethylene glycol and the absorber medium is also a jet containing a solution of 3,3-diethyloxadicarbocyanine iodide in ethylene glycol. The person skilled in the art is well aware that such an arrangement—when the lasing medium is excited, for instance, by a continuous argon ion laser—operates as a mode-Locked laser in which two short pulses circulate counter to each in the resonator 12 and which meet each other in the absorber medium 16 because in this way the pulses are able to pass through the saturable absorber medium 16 with minimum loss of energy. In this case each pulse is only required to furnish half of the energy necessary to bleach the absorption whereas a single pulse passing through the absorber medium by itself would be required to furnish all of the energy required, meaning that the overall arrangement would be thwarted with substantially higher losses. The ring laser oscillations, of course, build up in the aforementioned way so that the two pulses superimpose always in the saturable absorber medium where they form a standing wave. When one of the resonator mirrors (not shown) is slightly transparent, this mirror—indicated merely schematically by 18 in FIG. 1—is used to couple out the corresponding fractions of the two "round-trip" pulses in spatially separated directions 20,22 and can be detected outside of the resonator. In particular, these two pulses can be deflected so that they arrive simultaneously at the cathode of a photomultiplier or of a similar photodetector where due to the non-linear, in particular square function of the photocurrent with respect to the optical field strength of the arriving waves when there is a frequency difference between the two pulses, a beat frequency results which can be measured. In non-rotating ring laser there can be no difference in frequency since the laser automatically adjusts its frequency to the minimum of the resonator losses. When, however, the ring laser resonator rotates with an angular velocity $\Omega$ (radians.s$^{-1}$), i.e. at the peripheral velocity $v_r = \Omega \cdot R$ differing oscillation wavelengths $\lambda_1$ and $\lambda_2$ are produced in the opposing directions which are coupled out in the output directions 20, 22 so that at the photodetector two frequencies $v_1$ and $v_2$ are generated which in turn produce a corresponding beat frequency. The reason for these differing wavelengths occuring is that if the sense of rotation of the laser is as shown for example in the counter-clockwise (CCW) direction, the pulse travelling in the same direction must be faster, but the pulse travelling in the opposite direction must be slower than would be necessary in a stationary laser, to enable the two pulses always to coincide and superimpose in the saturable absorber 16 as is necessary for proper functioning of such a ring laser. For this purpose the difference in optical pathlength $\Delta L$ for the two counterpropagating pulses is $$\Delta L = \Omega \cdot R \cdot L / c_g,$$

where L is the length of the perimeter and $c_g$ the effective group velocity. In order to overlap in the saturable absorber, the two center frequencies $v_1$ and $v_2$ of the pulses have to change each by the amount $\Delta v_{1,2}$, but each in opposite directions, so that the total frequency difference is $$\Delta v = 2 \cdot \Delta L \cdot v / L \text{ or } \Delta v = (2\Omega R v / L) \cdot (L / c_g).$$

Since however the group velocity can only be sufficiently different in material of adequate density, i.e. in this case only in the laser medium 14 and in the absorber 16 having together the thickness l, the effective group velocity $c_g$ is given by $$c_g = c_o - c_o \frac{l(n - dn/dv - 1)}{2\pi R}.$$

where
$c_o$ velocity of light in vacuum
R radius of ring resonator
n effective refractive index in laser medium 14 and absorber 16 and
$\lambda$ wavelength This now gives by introducing the formula for $c_g$ and setting $L = 2\pi R$ $$\Delta v = \frac{4\pi R^2 \Omega}{L \cdot \lambda} \left( 1 + \frac{l}{L} \left( n - \lambda \cdot \frac{dn}{d\lambda} - 1 \right) \right)$$

or with the area $A = \pi R^2$ $$\Delta v = \frac{4\pi A \Omega}{L \cdot \lambda} \left( 1 + \frac{l}{L} \left( n - \lambda \cdot \frac{dn}{d\lambda} - 1 \right) \right).$$

The second term in the outer bracket is a minor correction that tends to zero when l tends to zero, so that in the limit for l=0 the usual Sagnac formula for the dispersion-free ringlaser gyroscope is recovered.

This clearly shows that in contrast to what is expected form the theory of usual ring laser gyroscope, also ring laser gyroscopes using short pulses will lead to signals that are of nearly the same magnitude as conventional ring laser gyroscopes with continuous wave lasers. Now, however, no lock-in effect will occur in a ring laser gyroscope using the new arrangement, since backscatter from mirrors and other optical elements, which was explained to be the reason for the disastrous lock-in phenomenon, is of no importance, because the position, where the two counter-propagating pulses meet, is anyhow fixed to the resonator, i.e. at the position of the absorber.

It can clearly be seen that the ring laser gyro using the new effect is capable of easily achieving the sensitivity necessary for some applications and formerly unattainable. Detecting the shifts in frequency or wavelength can be obtained by various means. In the case of high rotation rates the differential frequencies become difficulty high and can only be measured with high technical sophistication. By contrast wavelength meters as known in laser technology as wavemeters e.g. of the type in which three Fabry-Perots or Fizeau interferometers are used without difficulty in this case, to permit establishing the wavelength also of pulsed laser beams. Due to the pulses being very short very broad rings or fringes result, however, the precise center position of the diffraction fringes can be safely determined to 1/100 or better due to the high pulse repetition frequency (typically 60-100 MHz) by averaging over many pulses.

Where lower rotation rates are involved the usual counting methods of the frequency difference can be applied and interpolating$\sqrt{}$ with a phase-locked-loop between the individual pulses. In an intermediate range both methods, namely frequency and wavelength measurement can be put to use together. For very low rotation rates, where $\Delta\lambda/\lambda \leq 10^{-6}$ only the frequency counting method can be used without difficulty.

In order to obtain the high sensitivity of the new arrangement as compared to conventional laser gyroscopes, the optical path length in the dispersive elements in the resonator cavity should be subject to temperature stabilization in the millikelvin range due to their temperature dependency, if full use is to be made of the full sensitivity available with the new effect. This involves at the same time a very good stabilization of the pumping power since part of the same is converted into heat in the amplifier and in the absorber.

Using a dye laser and an absorber comprising a free liquid jet necessitates very good insulation against acoustical and other mechanical "noise" to prevent them from changing l. In cases where such noise cannot be eliminated it is good practice to use solidstate lasers, e.g. color center lasers instead of dye lasers and crystals having color centers of a suitable kind as saturable absorbers. The color center laser itself can be pumped by laser diodes so that all-in-all only solid-state materials can be employed as active and passive components. Other laser and absorber materials can, of course, also be used when having adequate bandwidth and it should not prove difficult for the person skilled in the art to suitably combine laser and absorber materials from the above descriptions and the known criteria of mode-locked ring lasers having counterpropogating pulses.

Figure 2:
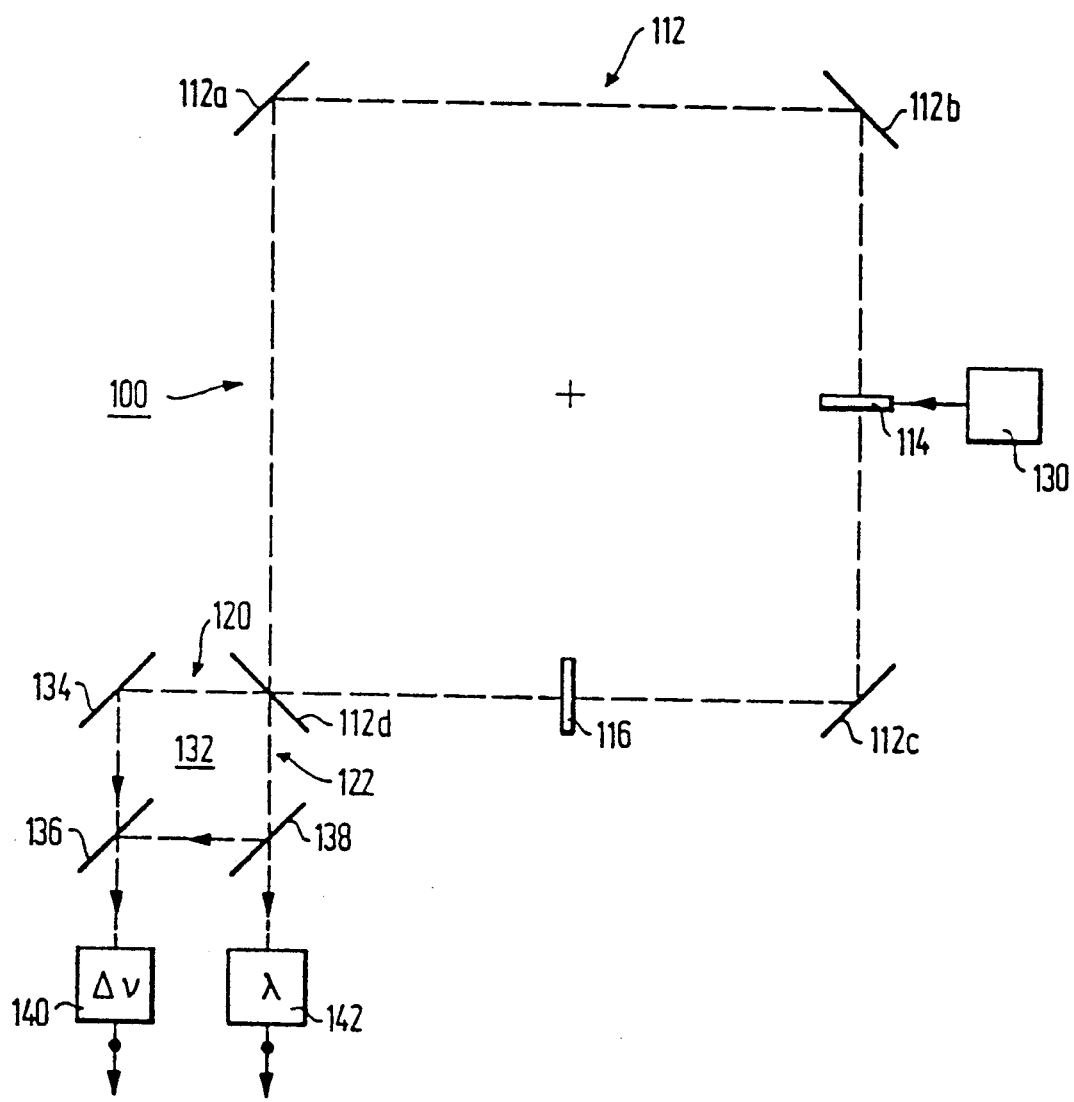
FIG. 2 is a schematic representation of a preferred embodiment of the laser gyro according to the invention.

FIG. 2 is a schematic diagram of a ring laser gyro 100 in accordance with one practical embodiment of the invention. The ring laser gyro according to FIG. 2 contains a ring resonator 112, formed by four mirrors 112a, 112b, 112c and 112d. The mirrors 112a thru 112c reflect the laser beam practically completely whilst mirror 112d is slightly, e.g. by a few percent transparent. In the middle between mirrors 112d, 112c an active color center laser medium 114 is provided which is roughly 40 μm thick. In the middle between mirrors 112c and 112d an approx. 40 μm thick crystal having color centers of a suitable kind is arranged as the saturable absorber 116. The color center laser medium is optically pumped by a source of pumping radiation 130 which contains a laser diode. Apart from the laser medium 114 and the absorber 116 the beam cavity of the ring resonator contains no dispersive optical elements.

The portions 120, 122 of the counter-circulating laser beam pulses coupled out by the partially transparent mirror 112d are processed in a detector means 132. The latter contains a practically totally reflecting mirror 134 and two semitransparent mirrors 136, 138 which, as shown, are arranged so that the two outcoupled laser beams are combined to fall on a photodetector 140, e.g. a secondary electron multiplier where they interfere and produce a beat, the frequency of which corresponds to the difference of the oscillating frequencies of the outcoupled laser radiation pulses.

Part of the outcoupled radiation 122 which is passed by the semi-transparent mirror 138 falls on a wavemeter device 142 of the aforementioned type which furnishes an electrical output signal corresponding to the wavelength of the laser radiation circulating in the one direction.

The examples described above can, of course, be modified in all sorts of ways without exceeding the scope of the invention. In general, however, the thickness of all dispersive elements contained in the cavity as measured in the direction of the laser resonator cavity, i.e. particularly the saturable absorber or means having the same effect must be small in comparison to the circumference of the laser resonator. The same applies preferably also to the thickness of the active lasing medium. The laser radiation pulses should also be short in comparison to the circumference of the laser resonator.

Good results have been obtained with the following values: circumference of laser resonator 100-200 cm; thickness of saturable absorber and lasing medium in each case 10-200 μm; pulse width as short as possible, e.g. down to the sub-picosecond range.

In a preferred embodiment of the invention, the following materials and dimensions were used:

| | |
|---|---|
| Circumferential length of the laser resonator: | 400 cm |
| Laser medium: | Rhodamine GG $10^{-4}$ M in ethylene glycol |
| Thickness of laser medium: | 150 μm |
| Saturable absorber: | DODCI $2.10^{-4}$ M (3,3' diethyloxadicarbo-cyanine iodide) in ethylene glycol |
| Thickness of saturable absorber: | 10 μm |
| Pump radiation source for laser medium: | Ar$^+$ ion laser $\lambda$ = 514.5 nm |
| Duration of laser pulses: | 100 femtoseconds. |

What is claimed is:
1. A ring laser gyro comprising:
   a) a loop-shaped laser resonator cavity subject to rotation in space;
   b) laser generation means for generating two opposed laser oscillation pulses of nominally similar frequencies and circulating in opposing directions in said laser cavity said laser pulses each having a frequency parameter and a wavelength parameter and said laser generation means having:
      i) an active laser medium positioned within said laser cavity; and
      ii) a pumping energy source for said active laser medium;
   c) a detector device for measuring changes in at least one of said parameters of each of said laser oscillation pulses as a function of a full rotation in space of said resonator; and
   d) fixing means for fixing a standing wave in said resonator said fixing means containing a saturable absorber medium through which said laser pulses pass;
said standing wave being the result of interaction between said opposed laser oscillation pulses and being stationary relative to said rotatable resonator.

2. A ring laser gyro according to claim 1 wherein said saturable absorber medium comprises a dispersive 3. A ring laser gyro according to claim 1 wherein said ring-shaped laser cavity has a first optical path length and said fixing means has a second optical path length being small in comparison with said first optical path length.

4. A ring laser gyro according to claim 1 wherein said ring-shaped laser cavity has a first optical path length and said laser oscillation pulses have a length which is small in comparison with said first optical path length.

5. A ring laser gyro according to claim 1 comprising temperature stabilization means for stabilizing the temperatures of said optical resonator, said active laser medium and said fixing means.

6. A ring laser gyro according to claim 1 wherein said active laser medium and said fixing means are solidstate elements.

7. A ring laser gyro according to claim 1 wherein said laser cavity contains no further dispersive elements besides said active laser medium and said fixing means.

8. A ring laser gyro according to claim 6 wherein said ring-shaped laser cavity has a first optical path length and said fixing means has a second optical path length being small in comparison with said first optical path length, said laser oscillation pulses have a pulse length which is also small in comparison with said first optical path length and said gyro further comprises temperature stabilization means for stabilizing the temperatures of said optical resonator, said active laser medium and said fixing means and wherein said laser cavity contains no further dispersive elements besides said active laser medium and said fixing means.

* * * * *